United States Patent [19]

Dreyer, Jr. et al.

[11] Patent Number: 5,700,077
[45] Date of Patent: Dec. 23, 1997

[54] LINE LIGHT SOURCE INCLUDING FLUORESCENT COLORANT

[75] Inventors: John F. Dreyer, Jr., North Oaks; Thomas I. Bradshaw, Afton; David M. Burns, Woodbury; Lee A. Pavelka, Cottage Grove; Bruce D. Orensteen, St. Paul, all of Minn.

[73] Assignee: Minnesota Mining and Manufacturing Company, St. Paul, Minn.

[21] Appl. No.: 474,726

[22] Filed: Jun. 7, 1995

Related U.S. Application Data

[63] Continuation of Ser. No. 409,332, Mar. 23, 1995, abandoned.

[51] Int. Cl.⁶ .................................................. F21V 7/04
[52] U.S. Cl. ........................... 362/32; 362/293; 362/243
[58] Field of Search .............................. 362/26, 32, 31, 362/242, 243, 293

[56] References Cited

U.S. PATENT DOCUMENTS

| Re. 34,141 | 12/1992 | Okuda | 524/86 |
|---|---|---|---|
| 3,116,256 | 12/1963 | D'Alelio et al. | 252/301.2 |
| 3,830,682 | 8/1974 | Rowland | 161/2 |
| 3,970,632 | 7/1976 | Yoshiura et al. | 260/42.21 |
| 4,097,917 | 6/1978 | McCaslin | 362/32 |
| 4,260,220 | 4/1981 | Whitehead | 350/96.28 |
| 4,382,272 | 5/1983 | Quella et al. | 362/84 |
| 4,544,725 | 10/1985 | Priola et al. | 526/301 |
| 4,615,579 | 10/1986 | Whitehead | 350/96.1 |
| 4,691,015 | 9/1987 | Behrens et al. | 544/198 |
| 4,743,642 | 5/1988 | Yanacek et al. | 524/358 |
| 4,750,798 | 6/1988 | Whitehead | 350/96.1 |
| 4,778,837 | 10/1988 | Waterman et al. | |
| 4,779,166 | 10/1988 | Tanaka et al. | 362/31 |
| 4,787,708 | 11/1988 | Whitehead | 350/96.28 |
| 4,805,984 | 2/1989 | Cobb, Jr. | 350/96.28 |
| 4,834,495 | 5/1989 | Whitehead et al. | 350/96.28 |
| 4,839,405 | 6/1989 | Speelman et al. | 524/99 |
| 4,848,385 | 7/1989 | Pennella | 135/16 |
| 4,850,665 | 7/1989 | Whitehead | 350/96.1 |

(List continued on next page.)

FOREIGN PATENT DOCUMENTS

| 0 489 561 A1 | 6/1992 | European Pat. Off. | B44F 1/04 |
|---|---|---|---|
| 2 627 679 | 2/1988 | France . | |
| 2 653 253 | 10/1989 | France . | |
| 43 13 519 A1 | 10/1994 | Germany | B41M 1/24 |
| 57-119941 | 10/1982 | Japan | C08L 23/02 |
| 58-98357 | 9/1983 | Japan | C08L 67/00 |
| 60-182402 | 9/1985 | Japan . | |
| 2-16042 | 2/1990 | Japan | B32B 7/02 |
| 1 491 681 | 11/1977 | United Kingdom . | |

OTHER PUBLICATIONS

"Structure and Properties of Aromatic Polycarbonates", *Chemistry and Physics of Polycarbonates*, by Schnell, pp. 183, 1964.

"New Daylight Fluorescent Pigments", Carlini et al., *Dyes and Pigments*, vol. 3, 59–69, 1982.

"Characteristic Features of the Matrix Effect on the Stokes Shift of Fluorescent Dye Molecules in Pure and Plasticized Polymers", by Eisenbach, *Journal of Applied Polymer Science*, vol. 28, 1819–1827, 1983.

"The Formulation of Fluorescent Coatings", by Martindill et al., *JOCCA*, 485–486, 197, 1989.

"The Photochemistry of Bisphenol-A Polycarbonate Reconsidered", by Rivaton et al., *Polymer Photochemistry*, vol. 3, 463–481, 1983.

*Primary Examiner*—Ira S. Lazarus
*Assistant Examiner*—Alfred Basichas
*Attorney, Agent, or Firm*—Robert H. Jordan; Stephen W. Buckingham

[57] ABSTRACT

A line light source includes point light source and a light distribution assembly for transporting light from the point source. A fluorescent colorant is included in the light distribution assembly.

10 Claims, 1 Drawing Sheet

U.S. PATENT DOCUMENTS

| | | | |
|---|---|---|---|
| 4,857,595 | 8/1989 | Kazmierzak et al. | 525/142 |
| 4,863,981 | 9/1989 | Gugumus | 524/97 |
| 4,896,943 | 1/1990 | Tolliver et al. | 350/105 |
| 4,904,574 | 2/1990 | Suzuki | 430/372 |
| 4,906,070 | 3/1990 | Cobb, Jr. | 350/286 |
| 4,912,605 | 3/1990 | Whitehead | 362/32 |
| 4,938,563 | 7/1990 | Nelson et al. | 350/103 |
| 4,981,773 | 1/1991 | Suzuki | 430/372 |
| 4,996,632 | 2/1991 | Aikens | 362/32 |
| 5,004,770 | 4/1991 | Cortolano et al. | 524/99 |
| 5,040,883 | 8/1991 | Cobb, Jr. | 350/452 |
| 5,043,850 | 8/1991 | Dreyer, Jr. | 362/26 |
| 5,056,892 | 10/1991 | Cobb, Jr. | 359/831 |
| 5,057,562 | 10/1991 | Reinert | 524/87 |
| 5,068,356 | 11/1991 | Wicher | 548/546 |
| 5,069,964 | 12/1991 | Tolliver et al. | 428/325 |
| 5,073,404 | 12/1991 | Huang | 427/39 |
| 5,095,415 | 3/1992 | Anderson et al. | 362/329 |
| 5,096,977 | 3/1992 | MacLeay et al. | 525/343 |
| 5,102,927 | 4/1992 | Rody et al. | 524/100 |
| 5,112,891 | 5/1992 | Haruna et al. | 524/101 |
| 5,117,478 | 5/1992 | Cobb, Jr. et al. | 385/133 |
| 5,124,456 | 6/1992 | Carette et al. | 546/193 |
| 5,132,387 | 7/1992 | Baron et al. | 528/49 |
| 5,140,081 | 8/1992 | Seltzer et al. | 526/204 |
| 5,145,893 | 9/1992 | Galbo et al. | 524/99 |
| 5,162,405 | 11/1992 | MacLeay et al. | 524/91 |
| 5,171,770 | 12/1992 | Nakagawa | 524/91 |
| 5,177,246 | 1/1993 | Pitteloud | 560/67 |
| 5,213,711 | 5/1993 | Fast et al. | 252/301.35 |
| 5,234,888 | 8/1993 | Defieuw et al. | 503/227 |
| 5,258,896 | 11/1993 | Dreyer, Jr. | 362/307 |
| 5,272,562 | 12/1993 | Coderre | 359/529 |
| 5,306,456 | 4/1994 | Suhadoinik et al. | 264/171 |
| 5,334,699 | 8/1994 | Hsieh | 528/373 |
| 5,348,580 | 9/1994 | Chassot | 106/410 |
| 5,363,470 | 11/1994 | Wortman | 385/147 |
| 5,398,170 | 3/1995 | Lee | 362/32 |

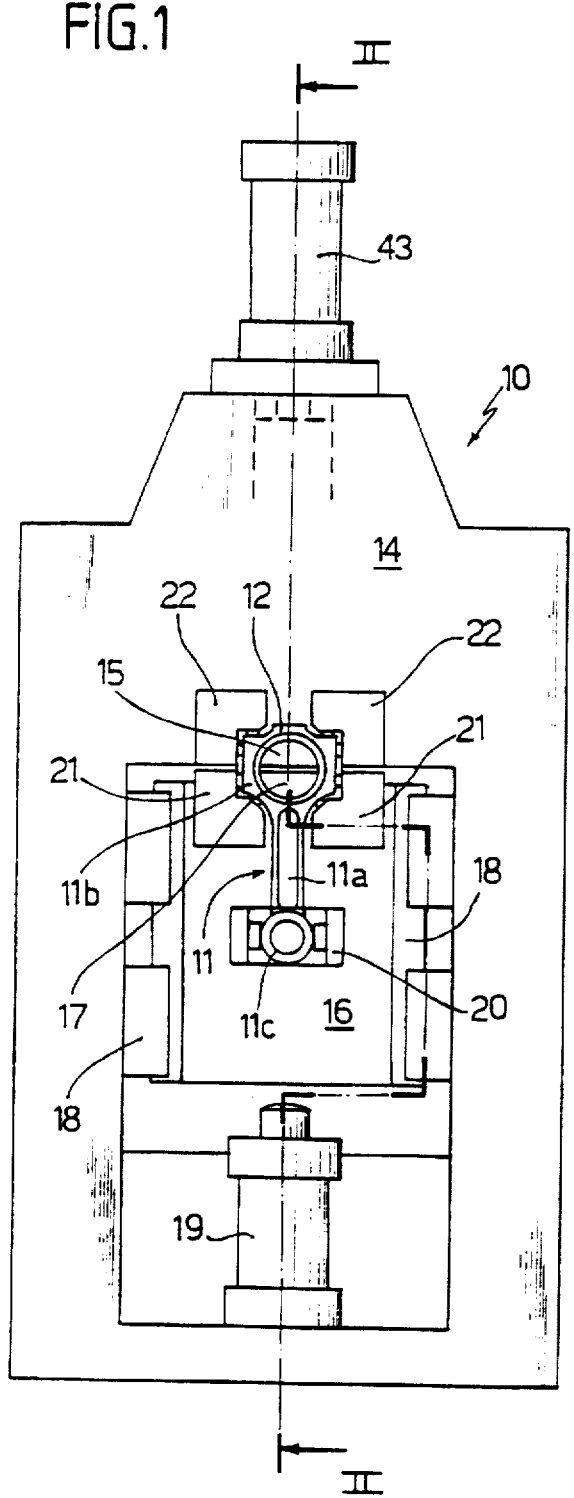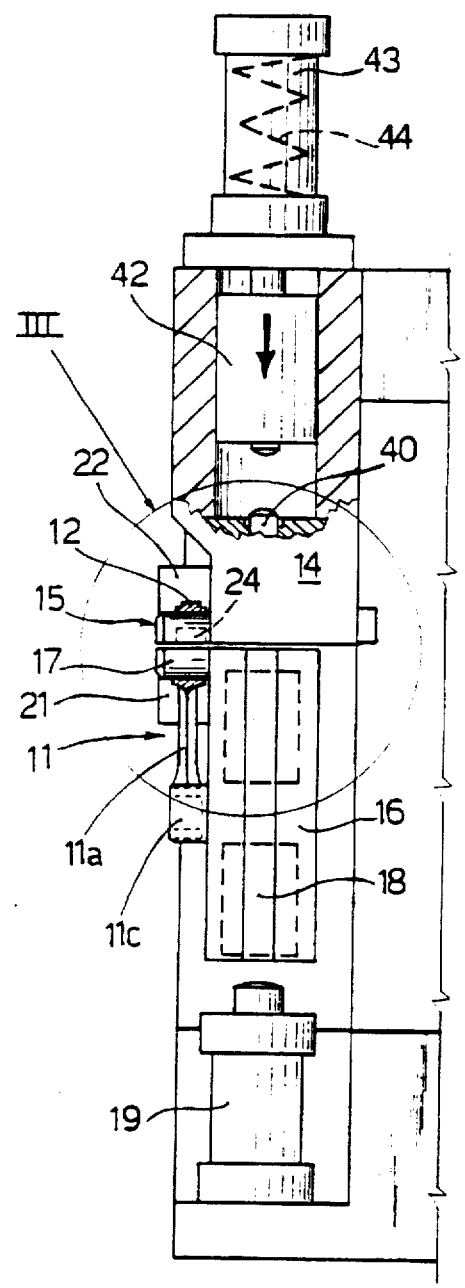

LINE LIGHT SOURCE INCLUDING FLUORESCENT COLORANT

CROSS-REFERENCE TO RELATED APPLICATION

This is a continuation of U.S. application Ser. No. 08/409,332, filed Mar. 23, 1995, abandoned.

1. Field of the Invention

The present invention relates to light sources which employ light conduits operating on the principle of total internal reflection. In particular, the present invention relates to a line light source which includes a fluorescent colorant.

2. Background

Light sources used in traffic and navigational control are generally point or near-point sources. Common examples include semaphores and hazard lights commonly placed around road construction areas.

More recently line light sources have been introduced in traffic control and hazard conspicuity applications. An exemplary line light source, disclosed in U.S. Pat. No. 5,043,850 (Dreyer, Jr.), employs a light conduit of the type disclosed in U.S. Pat. No. 4,805,984 (Cobb, Jr.). Two light sources differing in at least one optical property are optically coupled to opposing ends of the light conduit. If the optical property which differs is color, the light conduit will appear a first color when viewed from one direction and a second color when viewed from the opposite direction. An additional line light source is disclosed in U.S. Pat. No. 5,258,896 (Dreyer, Jr.).

Line light sources provide excellent conspicuity enhancement in environments of low ambient light such as, for example, at night or in heavy cloud cover. It has been determined that light sources having a base power level of as little as 20 watts may be sufficient to illuminate line light sources in low ambient light environments. However, environments of relatively high ambient light levels such as, for example, daytime conditions present particular conspicuity problems. Because sunlight is essentially white light, a line light source which emits white light is less conspicuous in sunlight than at night. One method of increasing the daytime conspicuity of a line light source which emits white light is to increase its brightness by using higher wattage light sources. This requires energy inputs into the system above the base power level required to provide sufficient luminance for night time viewing conditions. This additional energy is essentially wasted when the line light source is used in environments of low ambient light.

A second method of increasing the daytime conspicuity of a line light source is to position colored light filters adjacent the light sources to produce colored light, as disclosed in U.S. Pat. No. 5,043,850. Because colored light contrasts with the ambient white light, a colored line light source is more conspicuous than a non-colored line light source. However, because color filters absorb a portion of the white light emitted by the light source, this method also requires additional energy to produce a desired luminance.

Accordingly, there is a need in the art for a line light source which is highly conspicuous in an environment of high ambient lighting such as, for example, daylight conditions. There is also a need in the art for an energy efficient line light source which does not require substantial increases in energy input above a base level required to provide conspicuity at night to produce high conspicuity in conditions of high ambient lighting.

SUMMARY OF THE INVENTION

The present invention provides a line light source which exhibits improved conspicuity in environments of high ambient lighting conditions. According to one embodiment of the present invention, a line light source includes a light conduit which comprises a thin film of a totally internally reflecting material, a light source optically coupled to said light conduit for introducing light into a first end of the light conduit, and a fluorescent colorant in the light directing film. In another embodiment of the present invention, the light conduit is preferably disposed substantially entirely within a tubular housing. In this embodiment, either the thin film or the housing may include a fluorescent colorant. In an alternative embodiment of the present invention, a separate thin film comprising a fluorescent colorant may be employed. Advantageously, the fluorescent colorants increase the conspicuity of the line light source in environments of high ambient light without substantially reducing the light output of the tubes in environments of low ambient light.

In yet another embodiment of the present invention at least one of the tubular housing or the light conduit comprises a polymeric matrix, a colorant, and hindered amine light stabilizer, wherein the colorant contains at least one of the dyes selected from the group of thioxanthone, perylene imide and thioindigiod compounds and the polymeric matrix comprises polycarbonate.

DETAILED DESCRIPTION OF THE INVENTION

Structure of Line Light Source

Figure 1:
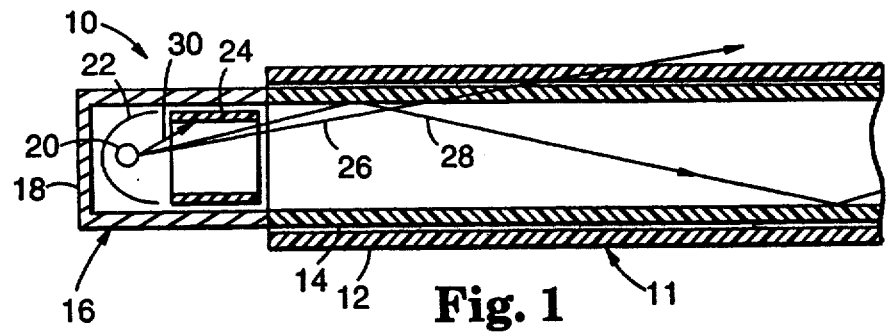
FIG. 1 is a cross-sectional view of a portion of one embodiment a line light source in accordance with principles of the present invention along its major axis.
Figure 2:
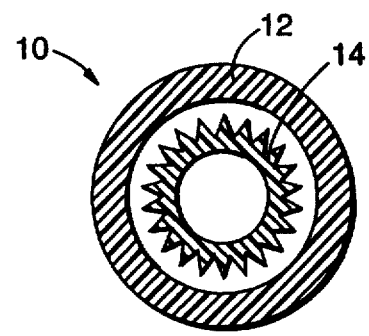
FIG. 2 is a cross-sectional view of the line light source depicted in FIG. 1 perpendicular to its major axis.

FIGS. 1 and 2 are cross sectional views of one embodiment of the invention, designated as line light source 10. The embodiment as shown comprises a light source 16 and a light distribution assembly 11 comprising two generally cylindrical hollow members having a common long axis, i.e., one within the other. The outer member is a strong, substantially optically transparent protective cover 12, and while it is preferred, it is not required. The inner member is a substantially optically transparent, totally internally reflecting thin film light conduit 14. As used herein, the term 'optically transparent' is used broadly to describe materials which transmit light without significant diffusion or distortion. Specifically, as used herein, the term 'optically transparent' shall not exclude materials which transmit specific wavelengths of light, and which thereby: appear colored to the eye of an observer. The diameter of cover 12 may be large enough to create an airspace between cover 12 and light conduit 14, but this also is not required.

In one embodiment of the present invention, cover 12 is a substantially optically transparent cylindrical tube preferably formed from a dielectric acrylic or polymeric material such as polypropylenes, polyurethanes, polysrtyrenes, and polyvinylchlorides. In a preferred embodiment the tube comprises a polycarbonate matrix. It will be appreciated, however, that cover 12 could be of a different shape or a different material to accommodate different applications. For example, in certain signing applications it may be desirable for only a portion of the cover 12 to comprise a substantially optically transparent polymeric material.

Light conduit 14 comprises a longitudinal hollow structure preferably made from a substantially optically transparent dielectric material, as taught in U.S. Pat. No. 4,805,984 (Cobb, Jr.,). The hollow structure is formed of a thin, flexible polymeric film having a smooth surface (the inner side as shown in FIG. 2) and a structured outer surface. A suitable film for light conduit 14 is the 3M Optical Lighting Film™ commercially available from the Minnesota Mining and Manufacturing Company of St. Paul, Min. A preferred structured surface includes a linear array of substantially right angled isosceles prisms arranged side by side. The perpendicular sides of each prism make an angle of approximately 45° with the tangent to the adjacent smooth surface opposite the structured surface. In one construction, the prisms extend longitudinally along the length of the outer surface of light conduit 14. However, it will be appreciated that the prisms may extend along the longitudinal axis of light conduit 14 in a helical fashion, as disclosed in commonly assigned U.S. Pat. No. 5,363,470, the disclosure of which is incorporated herein by reference.

The preferred light conduit 14 is made from a material which must be substantially optically transparent, and preferably is flexible, homogeneous, and isotropic. Suitable materials include commercially available acrylics and polycarbonates having nominal indices of refraction of 1.49 and 1.58, respectively. Other possible materials, selected to provide the required functionality, include polypropylenes, polyurethanes, polystryrenes, and polyvinylchlorides. Generally, polycarbonates are preferred for their relatively high indices of refraction and physical properties.

A suitable thickness of film used for light conduit 14 is about 0.38 millimeters, measured from the smooth inner surface to the lowest point of the grooves. For such a film, about 27 peaks per centimeter of perimeter is preferred. This film can be curved into a cylinder as small as about 7.6 centimeters in diameter without substantially affecting the optical properties of the film. Light conduit 14 may be a single section or multiple sections joined together, as required by the particular application.

In one embodiment of the invention, a light injector assembly 16 is disposed adjacent at least one end of light conduit 14 and cover 12 for directing light into light conduit 14. Light injector assembly 16 includes a case 18, which may be made of any suitably rigid, weatherable material, but is preferably of a metal, such as aluminum. Inside case 18 is a partially-collimated light source. As shown in FIG. 1, the light source includes a lamp 20 and a parabolic reflector 22. It will be appreciated, however, that other collimated light sources may be used.

Line light source 10 may optionally include an absorber 24 for absorbing highly uncollimated light, as disclosed in U.S. Pat. No. 5,258,896, which is incorporated herein by reference. Absorber 24 may be of any material and color that will absorb the light emitted by lamp 20. If, as often is the case, lamp 20 emits white light, absorber 24 is preferably flat black in color. Metallic absorbers painted flat black may be used. If, however, lamp 20 emits colored light, absorber 24 may be of any color that will absorb light of the color emitted by lamp 20.

The combination of the shape of the structured surface, and the optical properties of the material chosen, produce total internal reflection of light, if the light is properly directed into the light conduit 14.

Fluorescent Colorants

According to the present invention, the light distribution assembly of line light source 10 is provided with a fluorescent colorant to enhance its daytime conspicuity. As used herein, the term "colorant" shall mean any pigment or dye or other substance or combination of substances used to impart hue or chroma or value to an article. In one embodiment of the present invention, cover 12 is provided with a fluorescent colorant, while in another embodiment light conduit 14 is provided with a fluorescent colorant. In yet another embodiment of the present invention a separate thin film having a fluorescent colorant may be included with the line light source 10. It will be appreciated that the present invention also anticipates combinations of one or more of these elements.

In a preferred embodiment fluorescent dyes of the invention are dyes selected from the thioxanthone, perylene imide and thioindigoid classes of compounds, as disclosed in commonly assigned U.S. patent application Ser. No. 08/345,608, the disclosure of which is incorporated herein by reference. The invention anticipates that a single fluorescent colorant or dye may be used to color an article of the invention or that a combination of one or more fluorescent colorants and one or more conventional colorants may be used.

Typically, between about 0.01 and about 2.00 weight percent, and preferably between about 0.05 and about 0.70 weight percent and most preferably between about 0.1 and about 0.5 weight percent of fluorescent dye is contained in the article of the present invention. It will be understood that articles with dye loadings outside this range can be used in accordance with the invention. Although dye loading may vary depending upon the final application, these loadings are typical for about a 0.075 to 0.25 mm thick film. However, if the dye is added to a thicker film, lower dye loadings can give the same visual effect. As known by those in the art, articles having heavier dye loadings will exhibit brighter fluorescence and/or deeper color than will articles with lighter dye loadings of the same dye. However, articles having very high fluorescent dye loadings may exhibit a self-quenching phenomenon which occurs when molecules of the fluorescent dye absorbs the energy emitted by neighboring fluorescent dye molecules. This self-quenching causes an undesirable decrease in fluorescent brightness.

In some embodiments, colorants in the articles of the present invention will consist essentially of one or more dyes selected from the perylene imide, thioindigoid and thioxanthone classes of compounds. In other instances, the article may also contain other coloring agents such as pigments or other dyes in addition to those described to adjust the color and appearance of the article. For example, polycarbonate typically has a yellow cast. Minor amounts, e.g., about 0.01 weight percent or less, of pigments sometimes referred to as "blueing agents" may be incorporated to neutralize the yellow appearance. Other non-fluorescent or conventional dyes or pigments may also be added to the present invention. However, care should he taken in selecting such dyes and dye loadings so that the dyes do not significantly interfere with the performance of the fluorescent dyes. Dyes or pigments should not undesirably impair the transparency of the article as such would impair the retroreflective properties of the article.

Hindered Amine Light Stabilizers

Hindered amine light stabilizers (HALS) are included in one embodiment of the present invention. This is a somewhat surprising combination because, as one skilled in the art will recognize, it is not recommended to combine amines with polycarbonate. It has traditionally been known that amines attacked the carbonyl group of the polycarbonate, thereby degrading the polycarbonate (for example see Schnell, *Chemistry and Physics of Polycarbonates*, page 183, 1964).

Without intending to be bound by theory, it is believed that the combination of a sterically hindered amine, a polycarbonate matrix and a dye in accordance with the present invention prevents an as yet undefined degradation and/or reaction between the dye and the polycarbonate which could otherwise occur. Insofar as is presently known, the advantages of this embodiment of the present invention are attained through the combination of dye, polymer matrix material, and hindered amine light stabilizer described herein. Dyes in accordance with the present invention are thought to act as singlet oxygen sensitizers. Energy transfer, which generally occurs from the triplet state of the dye, is quenched by ground state molecular oxygen to produce active singlet oxygen. Singlet oxygen is then free to react with the dye, causing dye degradation. Alternatively, singlet oxygen may react with the polymer, leading to degradation of the polycarbonate. However, a representative hindered amine light stabilizer present in the invention is capable of directly quenching the singlet oxygen formed, preventing initiation of the degradation reactions. Hindered amine light stabilizers can also prevent secondary reactions initiated by polymer oxidation from proceeding. These reactions include a number of radical or peroxide-based chain reactions that are thought to occur in the photo-oxidation of polycarbonate which can result in polymer and dye degradation. Preventing these reactions increases the durability of the polycarbonate and the dye in the dyed system.

Any hindered amine light stabilizer is suitable for the present invention such as 2,2,6,6 tetraalkyl piperdine compounds but preferably 2,2,6,6 tetramethyl piperdine compounds are employed as the hindered amine light stabilizers due to the ready availability of the compounds. Hindered amine light stabilizers are included in articles of the present invention from about 0.05 to about 1.00 weight percent and preferably from about 0.10 to about 0.75 weight percent and most preferably from about 0.1 to about 0.5 weight percent.

Use and Operation

In operation, light emanating from lamp 20 either directly enters the light conduit 14, or is reflected into it by reflector 22. If the line light source 10 includes an absorber 24, as discussed above, highly uncollimated light will be absorbed by absorber 24. The remaining light from the light injector assembly 16 is directed into the light conduit 14. Because the light conduit 14 operates on the principle of total internal reflection, the majority of light entering the light conduit 14 propagates down the length of the light conduit 14 without being absorbed or otherwise extinguished. Because the light conduit 14 is closed at each end, the only way light in the light conduit may escape is through leakage.

Light leakage from light conduit 14 occurs due to imperfections in the light conduit 14 such as anisotropy in materials, or flaws in construction. Light exiting a light conduit by leakage leaves the conduit at substantially the same angle of incidence as that at which it strikes the conduit. This is in contrast to the extraction of light from light conduits taught in the prior art, which rely on diffusers or extractors to significantly change the direction of light rays within the light conduit by scattering, so that the rays strike the light conduit inner surface at angles approaching normal incidence. Such techniques produce relatively small intensities when observed at angles near the axis of the light conduit, the opposite of the effect produced by the present invention.

Advantageously, when a line light source 10 in accordance with the present invention is placed in an environment of high ambient lighting, fluorescent colorants in line light source 10 are excited by the ambient light and fluoresce. The fluoresced light increases the conspicuity of the line light source in an environment of high ambient lighting.

By contrast, in an environment of low ambient light conditions such as, for example, night lighting, line light source 10 is illuminated by light source 16. The use of fluorescent colorants provides two advantages in environments of low ambient lighting. First, it has been determined that including fluorescent colorants within the above-described concentration in the light distribution assembly does not significantly reduce the optical performance of line light source 10 in environments of low ambient light. More specifically, the inclusion of lime-green fluorescent colorants does not reduce the illuminance of line light source 10 when light source 16 is the source of illumination, and may increase the illuminance of line light source 10. This is discussed further in Example 2, below.

A second advantage associated with the use of a lime-green fluorescent colorant is that inclusion of the fluorescent colorant does not alter the color of the line light source at night. Without wishing to be bound by theory, applicants believe that line light source 10 does not appear fluorescent lime-green at night because the amount of fluorescent light emitted from light distribution assembly 11 is relatively small in relation to the total amount of light transmitted through light distribution assembly 11. Therefore, the fluorescent light is essentially washed out and is not particularly visible to the naked human eye under normal viewing conditions. This is an important feature of the present invention because traffic regulations in the Manual of Uniform Traffic Control Devices require that line light sources used to demarcate traffic hazards appear yellow when used on the left side of a roadway appear yellow and white when used on the right side of a roadway. A line light source with a fluorescent colorant exhibits increased daytime conspicuity and remains in compliance with regulations governing nighttime lighting.

EXAMPLE 1

A line light source in accordance with principles of the present invention was constructed using a fluorescent film and an optically clear housing and light conduit. Alternating sections of a line light source were covered with two distinctly colored fluorescent films: a yellow-green fluorescent film and an orange fluorescent film. The fluorescent films were attached to the outer surface of the optically clear housing and the line light source was placed in a test location at the 3M Transportation Safety Center in Cottage Grove, Min., USA The line light source was viewed from various angles under various daytime lighting conditions. The fluorescent sections of the line light source exhibited clearly superior conspicuity in daytime lighting conditions when compared to the optically clear sections of the line light source.

EXAMPLE 2

The optional performance of five line light sources were compared under night lighting conditions to determine the effect of including fluorescent colorants in the light distribution assembly. The results, illustrated in FIG. 3, demonstrate that including a lime-green fluorescent colorant in a line light source does not substantially reduce, and may increase the light output of the line light source in low ambient lighting conditions.

Four colored line light sources were compared with an optically clear line light source. Each colored light source comprised a substantially optically transparent light conduit and a colored housing. The four colors tested were: fluorescent lime green, amber fluorescent amber, and fluorescent red. Each line light source measured approximately 20 feet (6.1 meters) in length and 6.0 inches (15.25 centimeters) in diameter. Each line light source was connected to a 12 volt Osram AR111 light source at one end and luminance readings were taken at one foot (30.5 centimeter) intervals from the light source using a luminance meter. The results are presented in FIG. 3, which plots the measured light output of the line light source as a function of the distance form the light source. The light output of the optically clear line light source is represented by solid line 1. The light output of the fluorescent lime-green line light source is represented by dashed line 2. The light output of the amber line light source is represented by dashed line 3. The light output of the fluorescent amber line light source is represented by dashed line 4. The light output of the fluorescent red line light source is represented by dashed line 5.

Figure 3:
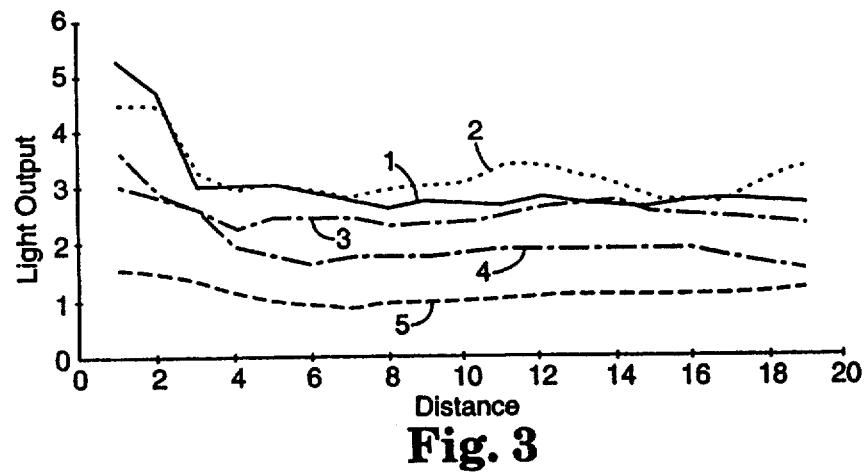
FIG. 3 is a graph showing experimental data comparing the optical performance of a fluorescent line light source in accordance with the present invention with non-fluorescent line light sources.

FIG. 3 demonstrates that the light output of the fluorescent lime-green line light source was greater than the light output of a substantially optically clear line light source over much of the length of the light source. Accordingly, the use of lime-green fluorescent colorants may also enhance the night-time conspicuity of a line light source.

What is claimed is:

1. A line light source comprising:

a light source;

a light distribution assembly optically coupled to said light source and including:
 (a) a hollow, tubular housing having a first end and a second end and having a length extending along a major axis of said housing, at least a portion of said housing comprising a substantially optically transparent material; and
 (b) a light conduit disposed substantially entirely within and extending along at least a portion of the length of said housing, said light conduit consisting essentially of a thin film of a totally internally reflecting material, wherein at least one of the tubular housing and the light conduit comprises a polymeric matrix, and a fluorescent colorant, and wherein the fluorescent colorant contains a dye selected from the group of dyes consisting of thioxanthone, perylene imide and thioindigoid compounds and wherein the fluorescent colorant is present in an amount sufficient generate fluorescent light detectable to the naked eye in response to ambient daytime lighting conditions.

2. A line light source according to claim 1, wherein:

said at least one of the tubular housing and light conduit comprises a fluorescent colorant in a concentration of between 0.01 percent by weight and 2.00 percent by weight.

3. A line light source according to claim 1, wherein:

said at least one of the tubular housing and light conduit comprises a fluorescent colorant in a concentration of between 0.10 percent by weight and 0.50 percent by weight.

4. A line light source comprising:

a light source;

a light distribution assembly optically coupled to said light source and including:
 (a) a hollow, tubular housing having a first end and a second end and having a length extending along a major axis of said housing, at least a portion of said housing comprising a substantially optically transparent material;
 (b) a light conduit disposed substantially entirely within and extending along at least a portion of the length of said housing, said light conduit consisting essentially of a thin film of a totally internally reflecting material;

wherein at least one of the tubular housing and the light conduit comprises a polymeric matrix, a colorant, and hindered amine light stabilizer, and wherein the colorant contains a dye selected from the group of dyes consisting of thioxanthone, perylene imide and thioindigoid compounds and the polymeric matrix comprises polycarbonate, and wherein the fluorescent colorant is present in an amount sufficient to generate fluorescent light detectable to the naked eye in response to ambient daytime lighting conditions.

5. A line light source according to claim 4, wherein:

at least one of said tubular housing and said light conduit comprises a fluorescent colorant in a concentration of between 0.01 percent by weight and 2.00 percent by weight.

6. A line light source according to claim 4, wherein:

at least one of said tubular housing and said light conduit comprises a fluorescent colorant in a concentration of between 0.10 percent by weight and 0.50 percent by weight.

7. A line light source according to claim 4, wherein:

at least one of said tubular housing and said light conduit comprises a hindered amine light stabilizer in a concentration of between 0.050 percent by weight and 1.00 percent by weight.

8. A line light source according to claim 4, wherein:

at least one of said tubular housing and said light conduit comprises a hindered amine light stabilizer in a concentration of between 0.10 percent by weight and 0.75 percent by weight.

9. A line light source according to claim 4, wherein:

at least one of said tubular housing and said light conduit comprises a hindered amine light stabilizer in a concentration of between 0.10 percent by weight and 0.50 percent by weight.

10. A line light source according to claim 4, wherein:

said hindered amine light stabilizer comprises 2,2,6,6 tetraalkyl piperidine compounds.

* * * * *

UNITED STATES PATENT AND TRADEMARK OFFICE
CERTIFICATE OF CORRECTION

PATENT NO. : 5,700,077

DATED : December 23, 1997

INVENTOR(S) : John F. Dreyer, Jr., Thomas I. Bradshaw, David M. Burns, Lee A. Pavelka, Bruce D. Orensteen It is certified that error appears in the above-identified patent and that said Letters Patent is hereby corrected as shown below:

IN THE DRAWINGS:

Figure 1 and 2 should be deleted and substitute with the attached page.

Col. 2, line 54, delete - - : - - between the words "thereby" and "appear."

Col. 4, line 57, delete the word "he" and insert in place thereof - - be - -.

Col. 7, line 9, insert - - , - - between the words "amber" and "fluorescent amber."

Col. 7, line 17, delete the word "form" and insert in place thereof - - from - -.

Col. 7, line 54, insert - - to - - between the words "sufficient" and "generate."

Signed and Sealed this

Fourteenth Day of April, 1998

Attest:

BRUCE LEHMAN

*Attesting Officer*  *Commissioner of Patents and Trademarks*